United States Patent [19]

Ishida et al.

[11] Patent Number: 5,229,438
[45] Date of Patent: Jul. 20, 1993

[54] TWO-COMPONENT EPOXY RESIN COMPOSITIONS

[75] Inventors: Yoshio Ishida; Hiroshi Iizuka, both of Chiba; Toru Tomoshige, Tokyo, all of Japan

[73] Assignee: Mitsui Petrochemical Industries, Ltd., Tokyo, Japan

[21] Appl. No.: 620,017

[22] Filed: Nov. 30, 1990

[30] Foreign Application Priority Data

Dec. 1, 1989 [JP] Japan ................................. 1-312787

[51] Int. Cl.$^5$ ............................................. C08L 63/02
[52] U.S. Cl. .................................. 523/428; 523/443; 524/450
[58] Field of Search ................. 524/450; 523/443, 428

[56] References Cited

U.S. PATENT DOCUMENTS

| | | | |
|---|---|---|---|
| 4,482,661 | 11/1984 | Liu | 523/439 |
| 4,701,481 | 10/1987 | Bogan et al. | 523/428 |
| 4,798,761 | 1/1989 | Wykowski et al. | 523/434 |
| 4,933,382 | 6/1990 | Kitagawa et al. | 523/428 |
| 4,940,740 | 7/1990 | Folda et al. | 523/428 |

FOREIGN PATENT DOCUMENTS

| | | | |
|---|---|---|---|
| 3137898 | 9/1981 | Fed. Rep. of Germany . | |
| 2219197 | 2/1974 | France . | |
| 18472 | 2/1980 | Japan | 523/428 |
| 5922918 | 7/1982 | Japan . | |
| 5984915 | 11/1982 | Japan . | |
| 60-179419 | 9/1985 | Japan | 523/434 |
| 62-236879 | 10/1987 | Japan | 523/428 |
| 62-252492 | 11/1987 | Japan | 523/428 |
| 1-275622 | 11/1989 | Japan | 523/428 |

OTHER PUBLICATIONS

"Handbook of Epoxy Resins", Lee, H., 1967, Gr. 143 TP 1180. E6L4C.6, pp. 14–49.

Primary Examiner—Melvyn I. Marquis
Assistant Examiner—D. Aylward
Attorney, Agent, or Firm—Birch, Stewart Kolasch & Birch

[57] ABSTRACT

A two-component, or two-part epoxy resin composition which adheres well to wet mortar and concrete is provided. One part comprising a non-cycloaliphatic epoxy resin, a reactive diluent in the form of an epoxy compound, a modifying resin selected from the group consisting of a coumarone-indene polymer resin, a dicyclopentadiene polymer resin, an acrylonitrile modified polyvinyl chloride resin, an amino terminated acrylonitrile-butadiene copolymer resin, and an epoxy terminated polybutadiene resin, a silane coupling agent having an epoxy or amino group, and a synthetic zeolite is combined, on use, with the other part comprising an amine curing agent selected from the group consisting of a cycloaliphatic polyamine, an aliphatic/aromatic polyamide, and an amine adduct.

19 Claims, No Drawings

TWO-COMPONENT EPOXY RESIN COMPOSITIONS

This invention relates to room-temperature curable, two-component (system) or two-part epoxy resin compositions featuring adhesion on wet surface, fast curing, adhesion after curing, water resistance, and chemical resistance.

BACKGROUND OF THE INVENTION

As is well known in the art, a variety of room-temperature curable epoxy resin compositions are prepared by blending various types of epoxy resin, compounding resin and additives which vary widely in nature.

Among the epoxy resins, the mainstream epoxy resins which are used as surface coatings for corrosion prevention and surface protection purposes are bisphenol A type epoxy resins. In general, reactive diluents, plasticizers, solvents and other additives, which are selected depending on the particular application or manner of usage, are added to the bisphenol A type epoxy resins to form compositions having an appropriate viscosity for application.

The curing agents commonly used for such compositions include polyamide amines, polyamine resins, modified polyamine resins and mixtures thereof.

These room-temperature curable epoxy resin compositions are often applied to the surface of concrete, mortar and other structures in situ. Since these compositions have poor adhesion on wet surfaces, concrete and mortar structures must be fully dried prior to application of the compositions, requiring a prolonged working time.

For improving the adhesion of room-temperature curable epoxy resin compositions to wet surfaces, there were proposed several methods including addition of fillers capable of reaction with water (e.g., portland cement, active alumina, and silica alumina), addition of polyamine curing agents in excess of their equivalent, addition of fluorinated surface active agents, modification of amine curing agents, and use of polythiol as a resin component.

Japanese Patent Public Disclosure (Kokai) No. 57-132456 discloses a two-component epoxy resin composition including a specific non-cycloaliphatic epoxy resin, a specific polyamide-amine curing agent and a cement composition.

Japanese Patent Public Disclosure (Kokai) No. 57-195139 discloses a two-component epoxy resin composition including a specific non-cycloaliphatic epoxy resin, a specific polyaminde-amine curing agent, a liquid acrylonitrile-butadiene copolymer and a cement composition.

Some of the compositions formulated according to these proposals, however, are still insufficient in wet adhesion. Some are improved in wet adhesion, but poor in other properties such as fast curing, chemical (mainly acid) resistance after curing, and durability. Some cured coatings are limited in use from a safety aspect since they allow health-hazardous organic components to leach out. For these and other reasons, compositions having satisfactory performance are not available.

The epoxy resins which are base resins of compositions are most often bisphenol A type epoxy resins as previously mentioned. Since these resins are liable to crystallize at low temperatures, compositions based on such epoxy resins tend to become solid, which suggests poor shelf stability and an economic disadvantage. Problems also arise with respect to chemical resistance after curing, durability and safety.

As to the curing agents, polyamide amines which are condensates between dimer acids and polyamines, modified cycloaliphatic polyamines (heterocyclic), and Mannich type polyamines are generally believed to be suitable for application to moistened or wet surfaces of concrete and mortar structures. These curing agents, however, retard drying and adversely affect water resistance after curing. Potential leaching of organic components from cured coatings gives rise to a safety problem.

SUMMARY OF THE INVENTION

An object of the present invention is to provide a room-temperature curable, two-component epoxy resin composition having improved wet adhesion, fast curing, adhesion after curing, water resistance, and chemical resistance.

According to the present invention, there is provided a two-component epoxy resin composition comprising 100 parts by weight of a non-cycloaliphatic epoxy resin having on average at least 1.7 epoxy groups per molecule and an epoxy equivalent of 100 to 1000, 5 to 30 parts by weight of an epoxy compound having 1.7 to 2.3 epoxy groups per molecule and an epoxy equivalent of 120 to 200, 2 to 35 parts by weight of at least one resin selected from the group consisting of a coumarone-indene resin, a dicyclopentadiene resin, an acrylonitrile modified vinyl chloride resin, an amino terminated acrylonitrile-butadiene copolymer resin, and an epoxy terminated polybutadiene resin, 0.5 to 5 parts by weight of a silane coupling agent having an epoxy or amino group, 0.5 to 5 parts by weight of a synthetic zeolite, and an amine curing agent selected from the group consisting of a cycloaliphatic polyamine, an aliphatic-/aromatic polyamine, and an amine adduct.

The resin is preferably selected from the group consisting of a dicyclopentadiene-allyl alcohol copolymer resin and an acrylonitrile modified vinyl chloride resin and mixtures thereof. The preferred synthetic zeolite is a zeolite having a mean particle size of up to 10 μm or a type A synthetic zeolite.

DETAILED DESCRIPTION OF THE INVENTION

The epoxy resin used herein is a non-cycloaliphatic epoxy resin having on average at least 1.7 epoxy groups per molecule and an epoxy equivalent of about 100 to about 1000. The ranges of the average number of epoxy groups per molecule and epoxy equivalent are preferably selected such that the cured epoxy resin may have a predetermined molecular weight or higher. In addition to the cured resin molecular weight consideration, the range of the epoxy equivalent is preferably selected in order that epoxy resin compositions be handled with ease, that is, to ensure that the epoxy resin does not crystallize and has an appropriate viscosity.

The epoxy resin used herein may be selected from epoxy resins which are liquid and insoluble in water, and which have low viscosity and little water permeability. Preferred epoxy resins are ordinary glycidyl ether type epoxy resins including bisphenol A type, bisphenol AD type, novolak type, bisphenol F type, and brominated bisphenol A type, special epoxy resins such as glycidyl ester type epoxy resins, glycidyl amine type epoxy resins, and heterocyclic epoxy resins, and various modified epoxy resins, insofar as they have on average at least 1.7 epoxy groups per molecule and an epoxy equivalent of about 100 to about 1000 and are non-cycloaliphatic. The epoxy equivalent is more preferably in the range of about 100 to about 500 and most preferably from about 100 to about 200.

The bisphenol type epoxy resins most commonly used among the above-listed epoxy resins will be described in detail. Bisphenol A type epoxy resins are produced via reaction between 2,2-bis(4-hydroxyphenyl)propane, i.e., bisphenol A and haloepoxides such as epichlorohydrin or $\beta$-methylepichlorohydrin. Bisphenol AD type epoxy resins are produced via reaction between 1,1-bis(4-hydroxyphenyl)ethane, i.e., bisphenol AD and haloepoxides such as epichlorohydrin or $\beta$-methylepichlorohydrin. Bisphenol F type epoxy resins are produced through reaction between bis(4-hydroxyphenyl)methane i.e. bisphenol F and haloepoxides such as epichlorohydrin or $\beta$-methylepichlorohydrin.

The use of bisphenol type epoxy resins is recommended in the practice of the invention, with bisphenol AD and/or F type epoxy resins being most preferred. Bisphenol A type epoxy resin may also be included at 20 to 50% by weight in addition to bisphenol AD and/or F type epoxy resins.

To accommodate an increase in viscosity of the epoxy resin composition due to the blending of another type of resin as will be described later, a reactive diluent in the form of an epoxy compound having 1.7 to 2.3 epoxy groups per molecule and an epoxy equivalent of 120 to 200 is combined with the epoxy resin. The preferred reactive diluents are trimethylolpropane triglycidyl ethers having an epoxy equivalent of 130 to 145 and 1,6-hexanediol diglycidyl ethers having an epoxy equivalent of 130 to 160, to name a few.

The other type of resin blended with the epoxy resin is a modifying resin which is selected from the group consisting of a coumarone-indene polymer resin, a dicyclopentadiene polymer resin, an acrylonitrile modified polyvinyl chloride resin, an amino terminated acrylonitrile-butadiene copolymer resin, and an epoxy terminated polybutadiene resin. Among these resins, dicyclopentadiene-allyl alcohol copolymer resins and acrylonitrile modified polyvinyl chloride resins are particularly preferred when the epoxy resin compositions are used as coatings on the inner wall of city water tanks or the like, since they are hydrophilic and water insoluble, and exhibit little leaching.

Irrespective of the presence of a hydrophilic functional group in their molecule, these resins themselves are insoluble in water and contribute to improvements in wet adhesion, adhesion after curing, and chemical resistance of the epoxy resin compositions of the invention.

Illustrative examples of the coumarone-indene polymer resin include G-90 and N-100 (manufactured by Nittetsu Chemical K.K.); examples of the dicyclopentadiene polymer resin include Quintone 1500 (dicyclopentadiene-vinyl ester copolymer resin manufactured by Nihon Zeon K.K.) and Quintone 1700 (dicyclopentadiene-allyl alcohol copolymer resin manufactured by Nihon Zeon K.K.); examples of the acrylonitrile modified polyvinyl chloride resin include 1000D (acrylonitrile modification 36%, manufactured by Denka Chemical K.K.); examples of the amino terminated acrylonitrile-butadiene copolymer resin include HYCAR ATBN 1300X16 (manufactured by Ube Kosan K.K.); and examples of the epoxy terminated polybutadiene resin include Polybuta EPT (manufactured by Idemitsu Petro-Chemical K.K.).

The silane coupling agent used herein includes an epoxy or amino group in its molecule. The silane coupling agent having an epoxy or amino group is effective in improving the adhesion between the cured epoxy resin and the underlying concrete or mortar structure because the silane group in its molecule hydrolyzes into a silanol group which is believed to be reactive with the underlying inorganic materials such as concrete or mortar, while the epoxy or amino group crosslinks with the epoxy resin and epoxy compound optionally along with an amine curing agent to be described later. The silane coupling agent is also effective in improving interfacial wettability.

Examples of the silane coupling agent include $\gamma$-glycidoxypropyltrimethoxysilane, $\gamma$-glycidoxypropylmethyldiethoxysilane, $\gamma$-(3,4-epoxycyclohexyl)ethyltrimethoxysilane, N-$\beta$-aminoethyl-$\beta$-aminopropyltrimethoxysilane, N-$\beta$-aminoethyl-$\beta$-aminopropylmethyldimethoxysilane, $\gamma$-aminopropyltrimethoxysilane, and $\gamma$-mercaptopropyltrimethoxysilane, with the $\gamma$-glycidoxypropyltrimethoxysilane and $\gamma$-glycidoxypropylmethyldiethoxysilane being preferred.

The epoxy resin composition of the invention also contains a synthetic zeolite which serves as a dehydrating agent for adsorbing moisture in objects to be coated.

There are available a wide variety of synthetic zeolites which are different in particle size and pore diameter, although type A synthetic zeolites in powder form having a mean particle size of up to 10 $\mu$m, preferably from 2 to 10 $\mu$m and a pore diameter of 3 to 5 Å, are preferred for their high water absorption. Such synthetic zeolites are commercially available as Baylit T Powder (a product of Bayer A.G.) and Molecular Sieve (a product of Union Carbide Co.), for example.

Further, the epoxy resin composition of the invention contains an amine curing agent selected from the group consisting of a cycloaliphatic polyamine, an aliphatic/aromatic polyamine, and an amine adduct.

Although linear aliphatic polyamines, aromatic polyamines, acid anhydrides and imidazoles are known as curing agents for epoxy resins, the invention uses an amine curing agent selected from the group consisting of a cycloaliphatic polyamine, an aliphatic/aromatic polyamine, and an amine adduct for the reasons including the room temperature curing ability, physical properties (especially viscosity), curing rate, and safety of the curing agent, as well as the physical properties, adhesion, and chemical resistance of cured resins.

Typically, the cycloaliphatic polyamine is isophorone diamine and the aliphatic/aromatic polyamine is m-xylylene diamine.

The amine adduct is an adduct of a polyamine with an epoxy or similar resin. More particularly, the amine adducts include polyamines such as m-xylylene diamine and isophorone diamine to which various epoxy resins such as bisphenol A epoxy resins are added. The epoxy resins which can form adducts with the polyamines are as previously described for the non-cycloaliphatic epoxy resins and their detailed description is omitted for brevity's sake. Preferred examples of the amine adducts are adducts of m-xylylene diamine and isophorone diamine with bisphenol A type liquid epoxy resins.

Each of the foregoing components making up the epoxy resin composition of the invention may be used alone or in admixture of two or more species.

The blending proportion of the foregoing components will be described.

The epoxy resin composition contains 5 to 30 parts by weight of the epoxy compound, 2 to 35 parts by weight of the modifying resin, 0.5 to 5 parts by weight of the silane coupling agent, 0.5 to 5 parts by weight of the synthetic zeolite, and the amine curing agent per 100 parts by weight of the non-cycloaliphatic epoxy resin.

The amount of the epoxy compound is preferably in the range of 5-30 parts by weight, and more preferably, in the range of 15-25 parts by weight per 100 parts by weight of the non-cycloaliphatic epoxy resin because within this range, the composition has an appropriate viscosity and the cured product has an appropriate molecular weight, durability, and especially high chemical resistance.

The amount of the modifying resin is in the range of 2-35 parts, preferably 5-25 parts by weight per 100 parts by weight of the non-cycloaliphatic epoxy resin because within this range, the composition exhibits improved wet adhesion, cured adhesion, and chemical resistance.

The amount of the silane coupling agent is in the range of 0.5-5 parts by weight, preferably 0.5-2 parts by weight per 100 parts by weight of the non-cycloaliphatic epoxy resin, because within this range, the composition is wettable to objects to be coated, and the cured product shows improved adhesion.

The amount of the synthetic zeolite is in the range of 0.5-5 parts by weight, preferably 1-3 parts by weight per 100 parts by weight of the non-cycloaliphatic epoxy resin, because within this range, the composition exhibits improved wet adhesion without a loss of remaining properties.

The curing agent is preferably added in such an amount that its amino group has an active hydrogen equivalent in the range of from 0.8 to 1.2, more preferably from 0.8 to 1.0 per equivalent of the epoxy group in the non-cycloaliphatic epoxy resin and the epoxy compound. Within this range, sufficient reaction takes place between amino and epoxy groups, leaving a minimal amount of unreacted amino and epoxy groups after curing, and consequently, cured epoxy resin compositions are durable and especially resistant against chemicals. Differently stated, the curing agent is preferably added in an amount of 8 to 40%, more preferably 15 to 30% by weight of the total weight of the essential components of the epoxy resin composition.

If desired, the epoxy resin composition of the invention may further contain additives such as pigments, defoaming agents, leveling agents, thixotropic agents, and plasticizers, as well as commonly used compounding agents such as polyfunctional reactive diluents and curing accelerators, depending on the particular application.

Particularly for coating purpose, the epoxy resin composition of the invention may contain the following pigments in addition to the essential components.

Extender pigments are preferably inorganic powders having a true density of 0.3 to 4.5 g/cm$^3$, an oil absorption of at least 11 ml, and a mean particle size of up to 10 μm. Examples include calcium carbonate, magnesium carbonate, silica, silica-alumina, glass powder, glass beads, mica, graphite, barium sulfate, aluminum hydroxide, talc, kaolin, acid clay, activated clay, bentonite, diatomaceous earth, montmorillonite, dolomite, etc., with calcium carbonate, silica, barium sulfate, talc and kaolin being preferred.

Coloring pigments are preferably submicron powders having a density of less than 5.7 g/cm$^3$ and a mean particle size of less than 1 μm. Examples include inorganic coloring pigments such as titanium oxide, zinc white, carbon black, red oxide, cadmium red, titanium yellow, chromium oxide green, cobalt green, ultramarine, Prussian blue, cobalt blue, cerulean blue, cobalt violet, mars violet, etc., and organic coloring pigments such as Permanent Red, Hansa Yellow, Benzidine Yellow, Lake Red, Phthalocyanine Blue, Phthalocyanine Green, etc., with titanium oxide, ultramarine, cobalt blue, Phthalocyanine Blue, Phthalocyanine Green, chromium oxide green, titanium yellow, and red oxide being preferred.

The epoxy resin composition of the present invention may further contain silica, cements and other aggregates. Inclusion of the aggregates are particularly preferred when the epoxy resin composition is to be applied on a rough surface without any priming. The aggregates may be added to any desired extent insofar as sufficient adhesion strength is maintained. The epoxy resin composition may include silica at a mixing ratio by weight of, for example, 1:1.

The epoxy resin composition of the invention is of two-component or two-part type. The two parts, parts A and B, are formulated as follows.

The non-cycloaliphatic epoxy resin and the epoxy compound should be contained in a common part, say part A, while the curing agent should be contained in a part different from the non-cycloaliphatic epoxy resin and the epoxy compound, say part B.

The components other than the non-cycloaliphatic epoxy resin, epoxy compound, and curing agent may be contained in either or both of the two parts. The components may be blended so as to form parts A and B which have an appropriate viscosity to provide for easy operation, especially easy mixing, for example, 50 to 200 poises at 25° C. Particularly when the resin composition of the invention is used as a coating, the components are desirably blended to form parts A and B each having a viscosity of lower than 100 poises at 25° C.

In one typical embodiment, the main part or part A is prepared by blending the non-cycloaliphatic epoxy resin, epoxy compound, modifying resin, silane coupling agent, synthetic zeolite, and extender and/or coloring pigment while the curing part or part B is prepared by blending the curing agent and plasticizer. On use, the two parts are mixed together into a curable composition. It is desired that part B contain less than 20% by weight of the plasticizer.

The epoxy resin composition of the invention is generally curable at a temperature of 5° C. or higher, preferably from 10° to 60° C.

The epoxy resin composition can be coated onto the surface of wet concrete or mortar structure to form a coating which firmly bonds with the concrete or mortar. Therefore, the composition can be cured into a useful liner coating on the inner wall surface of concrete or mortar water tanks.

Next, a method of liner coating on the inner wall surface of a water pool, in particular, a drinking-water pool, which is carried out by using the epoxy resin composition of this invention is described.

When a coating composition is coated on a deteriorated surface of a concrete or mortar structure, pin holes and blisters are often formed.

Coating of the composition may be carried out without any priming (pretreatment of the underlying surface) in the case of a mortar-finished new concrete. Priming, however, will be required when the coating composition is applied on a rough mortar-finished, and when the coating composition is applied to concrete with holes, C-type pin holes, steps, wavy surface and other surfaces, irregularities. In particular, when a water pool is to be repaired because blisters or peelings have appeared on its aged surface, there will be formed pin holes and blisters if the coating is carried out without any priming.

In general, priming is carried out either by troweling a resin mortar having an inorganic finely-divided aggregate mixed therein, or by simply using a commercially available cheap cement-based primer.

A typical cement-based primer is described in Japanese Industrial Standard (JIS) A 6916. A primer of this type is often referred to as a cement filler. A cement-based primer of this type is prepared by mixing a powder mixture comprising a cement, an inorganic finely-divided aggregate and other compounding materials with a polymer emulsion or dispersion which is miscible with the cement.

The cement-miscible polymer emulsion or dispersion meets the requirement of JIS A 6023, and generally comprises a synthetic resin emulsion of acryl resin, vinyl acetate resin, synthetic rubber or the mixtures thereof. Particularly, a cement-based primer having a bond strength of at least 20 kg/cm$^2$ after curing for 24 hours.

In the use of the cement-type primer, water is always added thereto. Generally, a curing time of 7 days or longer is accordingly required. However, the epoxy resin composition of this invention can be applied on a cement-based based primer and made into a coating of fair appearance and sufficient bond strength even after curing of within 24 hours, as described below in Examples.

The epoxy resin composition may be applied to the surface of supports of concrete and mortar primed or non-primed by conventional coating techniques, for example, brush coating, roller coating, and airless spraying. For example, liners can be formed by spraying the composition through a two-part type airless spray gun under an injection pressure of 100 kg/cm$^2$ or higher.

EXAMPLES

Examples of the present invention are given below by way of illustration and not by way of limitation.

EXAMPLES 1-4 AND COMPARATIVE EXAMPLES 1-3

Main and curing parts were individually prepared in the formulation shown in Table 1, and mixed in the proportion shown in Table 1 to form epoxy resin coating compositions.

The compositions were evaluated by the following tests. The test results are shown in Table 2.

Testing for Evaluating Physical Properties (1) Half curing time

A coating composition was coated to a glass plate of 25 mm×350 mm×2 mm thick by means of an applicator being set up 400 μm. The coating was measured for half curing time using a coating dryness testing machine (manufactured by Nihon Rigaku Kogyo K.K.).

(2) Pencil hardness

A mild steel plate of 150 mm×75 mm×0.2 mm thick was degreased with solvent, coated with a coating composition, and allowed to stand at room temperature for two days. The cured coating on the steel plate was measured for pencil hardness according to JIS K5400, 6.14 pencil scratch test procedure. The coating had a dry thickness of 100 μm.

(3) Bending and impact tests

A bending test was carried out according to JIS G3492, 6.3 bending test procedure. An impact test was carried out by degreasing a mild steel plate of 150 mm×75 mm×5 mm thick with solvent, blasting the plate with steel grits, coating the plate with a coating composition to a wet thickness of 400 μm, and allowing the coating to stand at room temperature for two days. The cured coating on the plate was measured for impact strength according to JIS G3492, 6.3 impact test procedure.

(4) Adhesive strength

A standard mortar panel of 50 mm×50 mm×20 mm thick available from Nihon Test Panel K.K. was dipped in clean city water for one day and then wiped with cloth to remove any water on the surface. A coating composition was applied to the panel using a metal trowel. The coating had a wet thickness of 500 μm. The coating was allowed to cure while the lower half portion of the panel was dipped in water for 6 hours and thereafter, the entire panel dipped in water. After two days, the panel was taken out of water and wiped off water on the coating surface. The coating surface was roughened with #80 sand paper. A bond strength measuring jig in the form of a steel column with an outer diameter of 20 mm which had been blasted with steel grits was secured to the coating with an adhesive which was cured at room temperature for one day. After a superfluous portion of the coating surrounding the jig was scraped off with a cutter knife, tensile bond strength was measured using a Tensilon tensile tester manufactured by Toyo Boardwin K.K. The panel surface after stripping was visually observed.

(5) Cutter separation

The adhesion of the coating used in (4) was evaluated by making a cut between the coating and the underlying panel surface with a cutter knife and determining the ease of cutting.

(6) Migration or leaching of organic matters

A vessel of mild steel dimensioned 10 cm×10 cm×10 cm deep whose inner wall had been sand blasted was brush coated with a coating composition to a dry thickness of at least about 250 μm. The coating was cured and hardened at 20° C. for 6 hours. The vessel was then filled with test water prepared for a leaching test according to the test method of JWWA K115 by the Japan Water Associate and allowed to stand for one hour. The water was discarded and the vessel was filled with fresh test water again. The vessel was covered with polyethylene film free of any additive (plasticizer, etc.) and allowed to stand at 20° C. for 24 hours. A sample was taken out of the water and measured for KMnO$_4$ consumption and amine and phenol quantities according to JWWA K115.

(7) Airless spraying

A reinforced concrete (RC) panel of 1 m×30 cm×5 cm thick was dipped in clean city water overnight for wetting, taken out of the water, and wiped of accompanying water with a cloth. The panel was held upright and coated with a coating composition using an assembly of a two-part type airless spray gun Model B of Nihon Grey K.K., a hot hose, and a static mixer. The spray gun was operated such that the coating composition was sprayed at a temperature of 40°–50° C. under a pressure of at least 100 kg/cm$^2$.

Observation was made on the dispersion upon spraying, coating sags as sprayed, and blister. A coating thickness of more than 700 μm without observation of sags was regarded as passed.

As seen from Table 2, when the epoxy resin compositions of the invention containing a specific epoxy resin, epoxy compound, modifying resin, silane coupling agent and dehydrating agent were used as a coating composition, there were obtained coatings which could firmly bond to the wet surface of concrete or mortar, and were fast curing and free of blister. At the point of 6 hours after coating when half curing was over, there were obtained coatings which had minimized leaching of organic substances to water and passed the test of JWWA K115.

TABLE 1

| CE3 | E1 | E2 | E3 | E4 | CE1 | CE2 |
|---|---|---|---|---|---|---|
| Composition, parts by weight | | | | | | |
| Main part | | | | | | |
| Bisphenol AD epoxy resin[1] | 100 | 100 | 100 | 100 | 100 | 100 | 100 |
| 1,6-hexanediol diglycidyl ether[2] | 30 | 30 | 30 | 30 | 30 | 30 | 30 |
| Dicyclopentadiene-allyl alcohol copolymer resin[3] | 15 | 15 | — | — | 15 | 15 | 15 |
| Dicyclopentadiene-vinyl ester copolymer resin[4] | — | — | 15 | — | — | — | — |
| Coumarone-indene resin[5] | — | — | — | 15 | — | — | — |
| γ-glycidoxypropyltrimethoxysilane | 3 | 3 | 3 | 3 | 3 | 3 | 3 |
| Synthetic zeolite powder | 3 | 3 | 3 | 3 | 3 | 3 | — |
| Talc | 30 | 30 | 30 | 30 | 30 | 30 | 30 |
| Titanium oxide | 20 | 20 | 20 | 20 | 20 | 20 | 20 |
| Additive | 1.5 | 1.5 | 1.5 | 1.5 | 1.5 | 1.5 | 1.5 |
| Curing part | | | | | | | |
| m-xylylenediamine epoxy resin modified polyamine[6] | 100 | — | 100 | 100 | — | — | 100 |
| Isophoronediamine epoxy resin modified polyamine[7] | — | 90 | — | — | — | — | — |
| Diaminodiphenylmethane polyamine[8] | — | — | — | — | 100 | — | — |
| Heterocyclic aliphatic polyamine[9] | — | — | — | — | — | 100 | — |
| Talc | 20 | 20 | 20 | 20 | — | — | 20 |
| Blue paste[10] | 1 | 1 | 1 | 1 | — | — | 1 |
| Additive | 1.5 | 1.5 | 1.5 | 1.5 | — | — | 1.5 |
| Mixing ratio (main/curing part) | 100/50 | 100/50 | 100/50 | 100/50 | 100/30 | 100/40 | — |
| Viscosity immediately after mixing (poise at 20° C.) | — | — | — | — | 100 | 80 | — |

[1] viscosity 30 poises at 25° C., epoxy equivalent 165-185
[2] viscosity 50 poises at 25° C., epoxy equivalent 140-160
[3] Quintone 1700 by Nihon Zeon K.K., number average molecular weight 380 (GPC, calculated as polystyrene), hydroxyl value 220 mg KOH/g, softening point 100° C.
[4] Quintone 1500 by Nihon Zeon K.K., number average molecular weight 420 (GPC, calculated as polystyrene), saponification value 175 mg KOH/g, softening point 100° C.
[5] G-90 by Shin-Nittetsu Kagaku K.K., number average molecular weight 625 (freezing point depression), bromine value 13 mg KOH/100 g (JIS K2421), acid value ≦1 mg KOH/100 (JIS K5902), softening point 80-100° C. (JIS K2531), specific gravity 1.113 (JIS Z8807)
[6] viscosity 100 poises at 25° C., active hydrogen equivalent 91
[7] viscosity 110 poises at 25° C., active hydrogen equivalen 79
[8] amine value 280, active amine equivalent 100, liquid
[9] amine value 300, active amine equivalent 100, liquid
[10] Phthalocyanine Blue PR510 by Sumitomo Suncolor K.K. an aromatic hydrocarbon-formalin condensate Syntalon #370 by Tokyo Jusi Kogyo K.K. were mixed in a ratio of 2:1 and roll milled.

TABLE 2

| | Half curing time (hr) | Pencil hardness | Bend/impact test | Wet mortar | | Migrating organic substances | | | Airless spraying | | |
|---|---|---|---|---|---|---|---|---|---|---|---|
| | | | | Adhesion*[1] (kg/cm$^2$) | Cutter separation*[2] | KMnO$_4$ consumption (ppm) | Amine | Phenol | Dispersion | Sag | Blister |
| E1 | 3.1 | H | OK | 30 Sb100 | OK | 1.3 | OK | OK | OK | OK | OK |
| E2 | 5.8 | H | OK | 30 Sb100 | OK | 1.1 | OK | OK | OK | OK | OK |
| E3 | 3.5 | H | OK | 30 Sb100 | OK | 1.5 | OK | OK | OK | OK | OK |
| E4 | 4.5 | H | OK | 30 Sb100 | OK | 1.8 | OK | OK | OK | OK | OK |
| CE1 | 6.0 | H | OK | 17 Sb60Ad40 | No | 8.3 | OK | OK | OK | No | No |
| CE2 | 5.8 | H | OK | 20 Sb70Ad30 | No | 3.1 | OK | No | OK | No | No |
| CE3 | 3.1 | H | OK | 30 Sb100 | Fair | 1.3 | OK | OK | OK | OK | No |

[1] Wet mortar, adhesion
Sb: failure of the underlying mortar
Ad: separation between the underlying mortar and the coating
[2] Wet mortar, cutter separation
OK: good adhesion to prevent the cutter knife from making a cut between the coating and the underlying mortar
Fair: fair adhesion somewhat allowing the cutter knife to make a cut between the coating and the underlying mortar
NO: loose adhesion allowing the cutter knife to make a smooth cut between the coating and the underlying mortar

EXAMPLE 5

A mortar surface was coated with commercially available cement-based primers shown in the Table 3, and adaptability of the coating composition of Example 1 to the cement-based primers was examined. As described in Table 3, breakage was observed in all of the primer coatings irrespective of the bond strength.

Test procedure

1) Each cement-based primer was applied to a standard mortar board NTP (12×18×1 cm, manufactured by Nippon Test Panel Co., Ltd.) in accordance with the manufacturer's instructions. The cement-based primers were coated to 1 to 2 mm, and to a thicker thickness recommended by the manufacturer.

2) After predetermined periods of curing of each coated cement-based primer, the coating composition of Example 1 was coated on the cured primer to a thickness of 500 μm and dried for 24 hours. The thus coated board was then soaked in tap water for 2 weeks to measure bond strength of the coated film.

TABLE 3

| Cement-based primer | | Bond strength (kg/cm$^2$) Curing period of cement-based primer | | | | Breakage generated in the test |
|---|---|---|---|---|---|---|
| | | 16 hr | 24 hr | 48 hr | 7 days | |
| SBR latex | A | 25 | 24 | 25 | 26 | * |
| Acrylic emulsion | D | 14 | 24 | 24 | 24 | * |
| SBR latex + acrylic emulsion | I | 15 | 22 | 23 | 23 | * |

Note:
*Breakage in the primer coating was observed in all test samples irrespective of bond strength of the coated film.
A; AR 31, manufactured by Nihon Cement Co., Ltd.
D; Kaichion Filler, manufactured by Yabuhara Sangyo Co., Ltd.
I; Melox Slurry, manufactured by Showa Shell Sekiyu K. K.

As is evident from the test results shown in Table 3, when the coating composition of the present invention was applied on the cement-based primer, the cement-based primers could exert their inherent strengths even when the curing of 16 or 24 hours which is markedly shorter than the generally required period for curing of 7 days was effected. It is also to be noted that no blister in the coated epoxy resin composition was observed.

The above-described results indicate that the breakage took place in the primer coating because the epoxy resin coating had relatively strong adhesive strength.

EXAMPLE 6 AND COMPARATIVE EXAMPLE 4

The procedure of Example 5 was repeated by using AR 41 as the cement-based primer, but two coating compositions as shown in Table 4 were used instead of the coating composition of Example 1. Surface conditions of the thus obtained coatings were observed and the bond strengths of the coatings were measured.

TABLE 4

| | Coating Composition | Curing of primer | Bond strength of epoxy coating | Surface conditions of coatings |
|---|---|---|---|---|
| Example 6 | Composition of Example 1 | 16 hr | 24 kg/cm$^2$ | fair |
| | | 24 hr | 23 kg/cm$^2$ | fair |
| | | 48 hr | 23 kg/cm$^2$ | fair |
| | | 7 days | 24 kg/cm$^2$ | fair |
| Comparative Example 4 | Composition of Comparative Example 1 | 16 hr | 20 kg/cm$^2$ | poor |
| | | 24 hr | 21 kg/cm$^2$ | poor |
| | | 48 hr | 23 kg/cm$^2$ | fair |
| | | 7 days | 23 kg/cm$^2$ | fair |

Note:
AR 41, manufactured by Nihon Cement Co., Ltd., as used in Example 5 (footnote C) was used as the cement-type primer.
fair: No blisters or pin holes
poor: blisters and pin holes generated As is evident from the results shown in the above table 4, the coating composition of Example 1 can be applied on the cement-based primer and made into a coating of fair appearance even after curing of within 24 hours, while blisters and pin holes were formed when the composition of Comparative Example 1 was used under the same conditions. Therefore, by using the resin composition of the present invention, the curing time of the cement-based primer may be significantly shortened.

EXAMPLE 7 AND COMPARATIVE EXAMPLE 5

The coating compositions of Example 1 and Comparative Example 1 were compared for their properties as a coating. The coating compositions were coated directly on the standard mortar board to a thickness of 500 μm, and cured at 25° C. for 3 days.

Bond strength or wet mortar surface was evaluated by dipping the standard mortar panel in clean tap water for 3 days, wiping the surface of the mortar panel with a cloth, and thereafter applying the coating composition to the above-mentioned thickness. The mortar surface had a moisture of 15% or more measured by High Frequency Capacity Moisture Tester HI-500, 20 MHz manufactured by Kett Co.

It is to be noted that the coating composition was cured at 25° C. for 7 days for the test samples used in the chemical resistance tests, salt spray test and durability estimation test.

EXAMPLE 8

The expoxy resin composition of Example 1 was mixed with silica No. 8 at a mixing ratio by weight of 1:1. The thus obtained coating composition was applied to the standard mortar panel of Example 1 in the same way. The adhesive strength to the wet mortar panel was determined according to the test method (4) in Example 1. The results show tensile bond strengths of 24 kg/cm$^2$ for 16 curing hours, 24 kg/cm$^2$ for 24 curing hours, 23 kg/cm$^2$ for 48 curing hours and 24 kg/cm$^2$ for 7 curing days.

TABLE 5

| Items tested | Units, criteria | Example 7 | Comparative Example 5 |
|---|---|---|---|
| Coating composition | | Composition of Example 1 | Composition of Comparative Example 1 |
| Appearance | | | |
| Main part | | White viscous liquid | White viscous liquid |
| Curing part | | Deep blue viscous liquid | Deep green viscous liquid |
| Mixing ratio (main/curing part) | | 100/50 | 100/50 |
| Color of cured film | | Light blue | Light bluish green[1)] |
| Viscosity (BH type, 60 rpm) | | | |

TABLE 5-continued

| Items tested | Units. criteria | Example 7 | Comparative Example 5 |
|---|---|---|---|
| Main part | cps/25° C. | 9500 | 9000 |
| Curing part | cps/25° C. | 9500 | 5500 |
| Thick coating capacity (Sag tester) | μ/25° C. | 700 | 400 |
| Curability (semi curing) | hr/25° C. | 4 | 9 |
| Bond Strength to wet mortar surface | kg/cm$^2$ | Breakage in Primer coating material (25 kg/cm$^2$) | Breakage in primer coating, blisters formed (24 kg/cm$^2$) |
| Chemical resistance (steel plate) | | | |
| 10% caustic soda | 6 months at room temp. | Normal pass | Normal pass |
| 10% sulfuric acid | 6 months at room temp. | Normal pass | Normal pass |
| 2% bleaching powder | 6 months at room temp. | Normal pass | Normal pass |
| 1% sodium hypochlorite | 6 months at room temp. | Normal pass | Normal pass |
| Salt spray test (steel) plate, with cross cut) | JIS K-5400 | acceptable after 10,000 hours | Non acceptable after 2,000 hours |
| Durability estimation test[2] | Hot chlorine water-passing test (50° C.) | acceptable after 15 days** | Formation of blisters after 3 days |
| Water quality maintenance[3] Smell and taste | To be the same as raw water* | acceptable after 6 hours curing | Non acceptable after 24-hour curing (bad smell and taste) |
| | | 1.5 ppm | 7 ppm, not acceptable |
| Leaching of KMnO$_4$ | 2 ppm or less* | Not detected | Not detected |
| Leaching of amine | Not detected* | 0.005 ppm or below | 0.005 ppm or below |
| Leaching of phenol | 0.005 ppm or less* | 0.5 ppm | 1.0 ppm, not acceptable |
| Decrease in residual Cl$_2$ | 0.7 ppm or less* | | |

*Standard
**No blisters
Note.
[1])Strong odor and considerable changes in color are generated when sunlight or fluorescent lamp light is directed.
2)Durability estimation test: Coating composition was coated on the standard mortar board to form a dry film of 500 μm thickness. After curing, the test sample was exposed to a continuous flow of hot water (50° C) containing 500 ppm of chlorine to examine conditions of the coated films.
3)Water quality standard: Water quality test JWWAK-115

There have been described room-temperature curable, two-component epoxy resin compositions having improved wet adhesion, fast curing, adhesion after curing, water resistance, and chemical resistance.

The epoxy resin compositions can be applied in situ because of room temperature curing nature, and coated to concrete and mortar within a markedly reduced working time because of wet adhesion and fast curing.

These beneficial properties allow the epoxy resin compositions to find a wider variety of applications. The invention allows for machine coating of epoxy resin compositions to wet concrete and mortar which was difficult in the prior art, making it possible to apply a relatively thick coating over a relatively large area within a short time. The resulting liners permit contact with city water after a lapse of short curing time and are resistant against chemicals.

Although some preferred embodiments have been described, many modifications and variations may be made thereto in the light of the above teachings. It is therefore to be understood that within the scope of the appended claims, the invention may be practiced otherwise than as specifically described.

We claim:

1. A room temperature-curable, two-component epoxy resin composition for coating a wet surface, which exhibits minimal leaching of organic components into water, consisting essentially of:

100 parts by weight of a bisphenol epoxy resin having on average at least 1.7 epoxy groups per molecule and an epoxy equivalent of 100 to 1000, 5 to 30 parts by weight of at least one epoxy compound having 1.7 to 2.3 epoxy groups per molecule and an epoxy equivalent of 120 to 200, selected from the group consisting of trimethylolpropane triglycidyl ether and 1,6-hexanediol diglycidyl ether, 2 to 35 parts by weight of at least one resin selected from the group consisting of dicyclopentadiene-allyl alcohol copolymer resin and a dicyclopentadiene-vinylester copolymer resin, 0.5 to 5 parts by weight of a silane coupling agent having an epoxy or amino group in its molecule, 0.5 to 5 parts by weight of a synthetic zeolite, and at least one amine curing agent selected from the group consisting of isophorone diamine, m-xylylene diamine and an adduct of m-xylylene diamine with bisphenol A type liquid epoxy resins and an adduct of isophorone diamine with bisphenol A type liquid epoxy resins.

2. The composition of claim 1, wherein said synthetic zeolite is a synthetic zeolite having a mean particle size of up to 10 μm.

3. The composition of claim 2, wherein said synthetic zeolite is a synthetic zeolite having a mean particle size from 2 to 10 μm and a pore diameter of 3 to 5 Å.

4. The composition of claim 1, wherein said non-cycloaliphatic epoxy resin is at least one member selected from the group consisting of a bisphenol AD epoxy resin and a bisphenol F epoxy resin.

5. The composition of claim 1, wherein said silane coupling agent is at least one member selected from the group consisting of γ-glycidoxypropyltrimethoxysilane and γ-glycidoxypropylmethyldiethoxysilane.

6. The composition of claim 1, further comprising at least one additive selected from the group consisting of a pigment, a defoaming agent, a leveling agent, a thixotropic agent, and a plasticizer.

7. The composition of claim 6, wherein said pigment is an extender pigment or a coloring pigment.

8. The composition of claim 7, wherein said extender pigment is an inorganic powder having a true density of 0.3 to 4.5 g/cm$^3$, an oil absorption of at least 11 ml, and a mean particle size of up to 10 μm.

9. The composition of claim 8, wherein said extender pigment is selected from the group consisting of calcium carbonate, magnesium carbonate, silica, silica-alumina, glass powder, glass beads, mica, graphite, barium sulfate, aluminum hydroxide, talc, kaolin, acid clay, activated clay, bentonite, diatomaceous earth, montmorillonite, and dolomite.

10. The composition of claim 9, wherein said extender pigment is selected from the group consisting of calcium carbonate, silica, barium sulfate, talc, and kaolin.

11. The composition of claim 7, wherein said coloring pigment is a submicron powder having a density of less than 5.7 g/cm$^3$ and a mean particle size of less than 1 μm.

12. The composition of claim 11, wherein said coloring pigment is an inorganic coloring pigment or an organic coloring pigment.

13. The composition of claim 12, wherein said inorganic coloring pigment is selected from the group consisting of titanium oxide, zinc white, carbon black, red oxide, cadmium red, titanium yellow, chromium oxide green, cobalt green, ultramarine, Prussian blue, cobalt blue, cerulean blue, cobalt violet, and mars violet, and said organic coloring pigment is selected from the group consisting of Permanent Red, Hansa Yellow, Benzidine Yellow, Lake Red, Phthalocyanine Blue, and Phthalocyanine Green.

14. The composition of claim 1, further comprising an aggregate.

15. The composition of claim 14, wherein said aggregate is selected from the group consisting of silica and cement.

16. The composition of claim 15, wherein said silica is present at a mixing ratio of 1:1, by weight.

17. A coating composition for coating an inner surface of a city water pool, comprising said epoxy resin composition of claim 1.

18. The coating composition of claim 17, further comprising a pigment.

19. The coating composition of claim 17, further comprising an aggregate.

* * * * *